(12) United States Patent
Woo

(10) Patent No.: US 7,116,850 B2
(45) Date of Patent: Oct. 3, 2006

(54) HYDROPHONE MANDREL FOR PRECISE PLACEMENT OF GRATINGS

(75) Inventor: Daniel Ming Kwong Woo, Missouri City, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 220 days.

(21) Appl. No.: 10/796,594

(22) Filed: Mar. 9, 2004

(65) Prior Publication Data

US 2005/0201663 A1 Sep. 15, 2005

(51) Int. Cl.
*G02B 6/34* (2006.01)
(52) U.S. Cl. ....................................... 385/13
(58) Field of Classification Search ............. 385/13
See application file for complete search history.

(56) References Cited

U.S. PATENT DOCUMENTS

| | | | | |
|---|---|---|---|---|
| 5,363,342 A | * | 11/1994 | Layton et al. | 367/149 |
| 5,475,216 A | * | 12/1995 | Danver et al. | 385/125 |
| 5,737,278 A | * | 4/1998 | Frederick et al. | 367/149 |
| 5,748,565 A | * | 5/1998 | Cherbettchian et al. | 367/154 |
| 6,118,733 A | * | 9/2000 | Ames | 367/173 |
| 6,233,374 B1 | | 5/2001 | Ogle et al. | |
| 6,882,595 B1 | | 4/2005 | Woo | |
| 6,888,972 B1 | | 5/2005 | Berg et al. | |
| 2004/0202401 A1 | * | 10/2004 | Berg et al. | 385/12 |

FOREIGN PATENT DOCUMENTS

| | | |
|---|---|---|
| GB | 2 328 278 | 2/1999 |
| WO | WO 02/063248 | 8/2002 |
| WO | WO 2004/034096 | 4/2004 |

OTHER PUBLICATIONS

U.K. Search Report, Application No. GB0504902.8, dated Apr. 29, 2005.

* cited by examiner

*Primary Examiner*—Frank G. Font
*Assistant Examiner*—James P. Hughes
(74) *Attorney, Agent, or Firm*—Patterson & Sheridan, LLP

(57) ABSTRACT

A method and apparatus for reducing the difficulty of controlling the length of a section of optical waveguide wrapped around a mandrel separating Bragg gratings forming an interferometric sensor are provided. The section of optical waveguide may be wrapped on a mandrel having at least two different outer diameters. The mandrel may also include one or more bores for receiving and protecting the Bragg gratings.

23 Claims, 3 Drawing Sheets

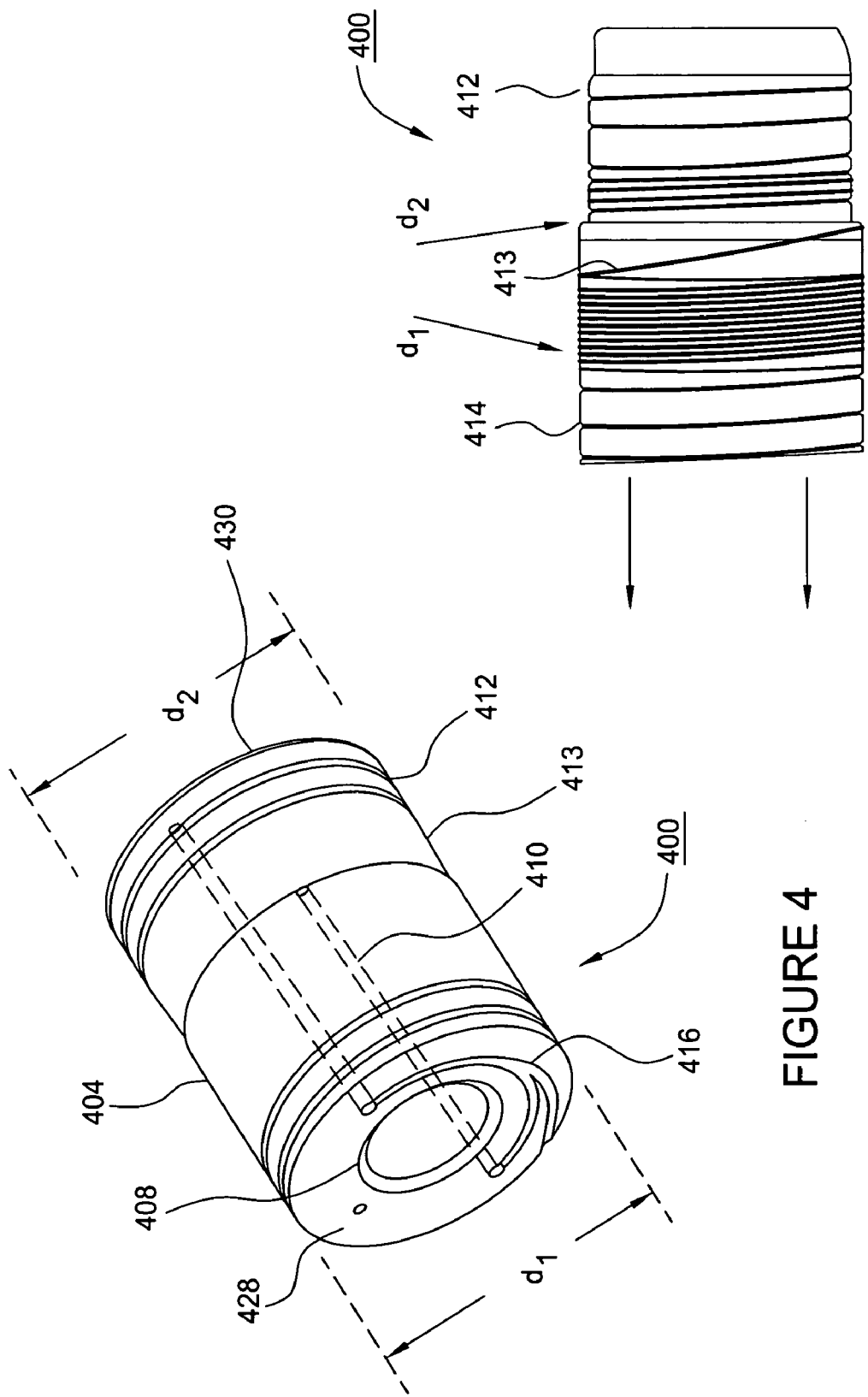

HYDROPHONE MANDREL FOR PRECISE PLACEMENT OF GRATINGS

BACKGROUND OF THE INVENTION

1. Field of the Invention

Embodiments of the present invention relate to optical waveguide interferometric-based hydrophones and, more specifically, to mandrels used in such hydrophones.

2. Description of the Related Art

A Bragg grating is an optical element that is reflective to light having wavelengths within a narrow bandwidth that is centered at a wavelength that is referred to as the Bragg wavelength. Bragg gratings are usually formed by photo-induced periodic modulation of the refractive index of an optical waveguide's core. A pair of Bragg gratings having a common Bragg wavelength and separated by a length of waveguide (e.g. a coiled fiber or coil) can form an interferometer that may be interrogated by sending light of the same Bragg wavelength through the interferometer. Reflections of light from the (partially-transmissive) Bragg gratings are sent back to optical detection equipment through the waveguide. By assessing the phase shift in light coincidently reflected from the two Bragg ratings, the length of the coil can be determined, as is well known.

Optical waveguide interferometers can be deployed in various ways to make the length of the coil (and hence, the phase shifts between coincidentally reflected pulses) dependent on physical parameters. For example, Bragg grating interferometers can be deployed in a number of different ways to make acoustic sensors. Reference, "A Fiber Laser Hydrophone Array," by D. J. Hill, et al., SPIE Vol. 3860. An optical waveguide hydrophone is typically made by winding a section of an optical waveguide (e.g., an optical fiber) separating a pair of Bragg gratings around a compliant cylindrical mandrel. When acoustic pressure impinges on the mandrel, the mandrel deforms slightly, changing the length of the waveguide separating the Bragg gratings. When forming such an acoustic sensor it is beneficial to tightly wind the optical waveguide (optical fiber) around the compliant cylindrical mandrel, which makes the fiber to follow the response of the mandrel that is designed to respond to acoustic pressure wave. The sensitivity of the sensor is proportional to the number of turns (or wraps), as described below.

One issue with mandrel-based optical waveguide, Bragg grating acoustic sensors is that the Bragg gratings themselves should be protected. Strain on the Bragg gratings can cause an excessive shift in the center frequency of the Bragg wavelength such that the Bragg gratings are no longer highly reflective at the correct wavelength. One way to isolate the Bragg gratings from excessive strain is to locate them within the mandrel itself. This can be accomplished by forming bores through the mandrel, locating a Bragg grating in one bore, wrapping the optical waveguide around the mandrel, and then bringing the optical waveguide through another bore such that the other Bragg grating is located in that bore. By placing the Bragg grating loosely inside the bore will isolate the grating from excessive strain and protect it from physical damages.

The length L of an optical waveguide wrapped on a cylindrical mandrel is about:

$$L \approx N \cdot \pi \cdot d$$

where N is the number of turns and d is the outer diameter of the mandrel. In order to have optimum interferometer performances in a system utilizing multiple acoustic sensors (e.g., an array), the length between the two gratings should be nearly identical between devices. However, manufacturing tolerances may lead to significant variations in length between the gratings. For example, when a mandrel is turned on a CNC machine, its outside diameter can vary by about +/−0.001 inch. If the optical waveguide is wrapped around the mandrel 70 times, the wrapped length can vary by as much as 0.14 inch. Furthermore, the process used to produce the Bragg gratings can locate the gratings only within a tolerance of about +/−0.1 inch. Thus, it is difficult to tightly wrap an optical waveguide around a cylindrical mandrel while positioning the Bragg gratings inside the mandrel (which may require a precision of +/−0.040 inch to do).

Therefore, a mandrel that reduces the difficulty of accurately controlling the length of an optical waveguide wrapped around the mandrel and allowing Bragg gratings separated by the length of optical waveguide to be accurately positioned would be useful.

SUMMARY OF THE INVENTION

One embodiment that is in accord with the principles of the present invention is a mandrel that reduces the difficulty of wrapping an optical waveguide Bragg grating interferometer such that the Bragg gratings are accurately positioned. Such a mandrel has at least two outer diameters.

Another embodiment that is in accord with the principles of the present invention is a bored mandrel that reduces the difficulty of wrapping an optical waveguide Bragg grating interferometer on the mandrel such that the Bragg gratings are accurately positioned within bores. Such a mandrel has at least two outer diameters and a bore for receiving a section of an optical waveguide that includes a Bragg grating.

Another embodiment of the present invention is an interferometric hydrophone having Bragg gratings that are physically protected in a bore or bores of a mandrel having at least two outer diameters. The mandrel enables controlled routing of the optical waveguide to prevent excessive optical loss while protecting the Bragg gratings from physical damages due to shock and vibration.

Another embodiment of the present invention is a method of controlling a length of an optical waveguide section during manufacture of an acoustic sensor. The method generally includes providing a mandrel having at least a first section with a first outer diameter and a second section with a second outer diameter, wrapping the optical waveguide section a first number of times around the first section and a second number of times around the second section, and controlling the wrapped length of the optical waveguide section by varying the first number and the second number.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates a cut-away view of a mandrel that is in accord with the present invention; and FIG. 5 illustrates a wound mandrel;

DETAILED DESCRIPTION OF THE PREFERRED EMBODIMENT

The principles of the present invention provide for optical waveguide interferometric hydrophones having Bragg gratings between optical waveguide sections that are wound on mandrels having at least two different outer diameters. Some embodiments of the present invention include bored mandrels, where the bores physically protect the Bragg gratings from both physical damage and from excessive strain. The different outer diameters enable accurate control of the length between the gratings which, in turn, allows accurate positioning of the Bragg gratings.

To facilitate understanding, embodiments of the present invention are described below with reference to acoustic sensors (hydrophones) as a specific, but not limiting application example. However, it should be appreciated that the apparatus and techniques described herein may be used to control the length between (and facilitate precise placement of) reflective elements of any type of interferometric sensor device.

Figure 1:
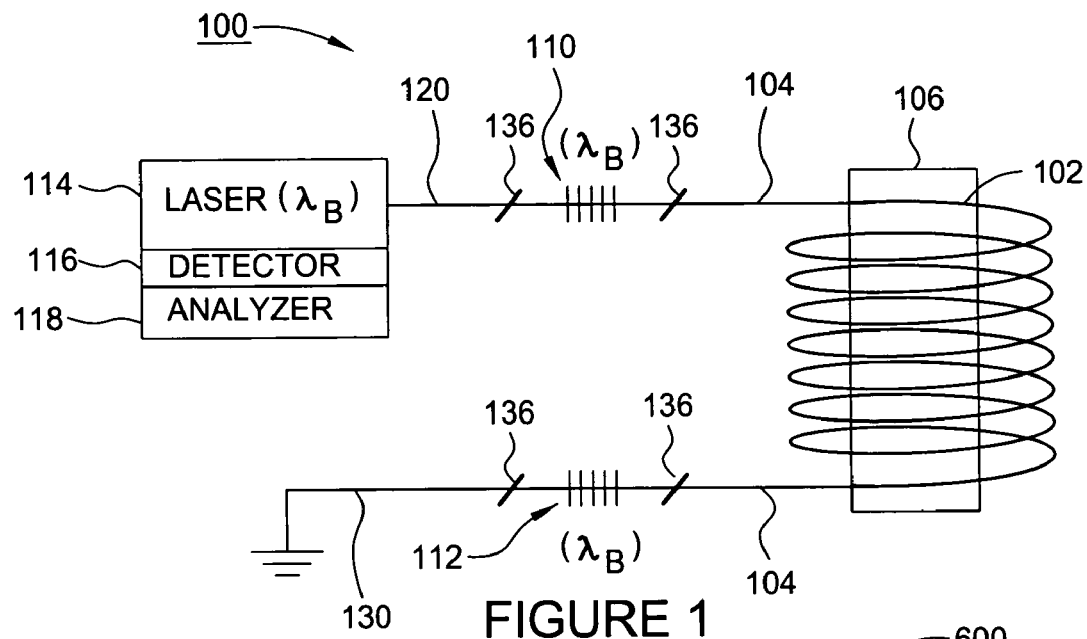
FIG. 1 schematically depicts a Bragg grating interferometric sensing system.

FIG. 1 schematically illustrates a simplified optical waveguide interferometric hydrophone system 100. The hydrophone system may operate in a similar manner to the hydrophone system described in the commonly owned co-pending application entitled "High Pressure And High Temperature Acoustic Sensor" Ser. No. 10/796569) filed herewith and incorporated by reference in its entirety. The hydrophone system 100 includes a sensing coil 102 comprised of a number of tightly wrapped turns of an optical waveguide 104 (such as an optical fiber) around a mandrel 106. The mandrel 106 should be understood as generically representing any of the inventive mandrels that are subsequently described. The sensing coil 102 is bounded by a pair of Bragg gratings 110 and 112 that have the same Bragg wavelength (λB). In the illustrated configuration, the sensing coil 102 acts as a sensor. This is because the length of the sensing coil 102 depends on the diameter of the mandrel 106, which, in turn, depends on the acoustic pressures impingent upon the mandrel 106.

Well known interferometric interrogation techniques, such as Fabry-Perot, Michelson, or Mach-Zehnder, can determine the length of the sensing coil 102. For example, a series of optical pulses from a pulse generator 114 can be applied to the sensing coil 102 through an input optical waveguide 120. Reflections of optical pulses from the Bragg gratings 110 and 112, which are partially transmissive, are detected by a detector 116 and analyzed by an analyzer 118. By assessing the phase shift in the pulses that are reflected from the two Bragg gratings 110 and 112, the length of the sensing coil 102 can be determined. An output optical waveguide 130 can be connected to other optical components or sensors deployed along with the hydrophone system 100.

In some applications, it may not be practical to form the sensing coil 102 and the Bragg gratings 110 and 112 along a continuous section of optical waveguide. In that case, the individual components, such as the input and output optical waveguides 120 and 130, the sensing coil 102, and the Bragg gratings 110 and 112 can be individually formed and then spliced together. FIG. 1 illustrates such splices using slash marks 136.

The length L of the sensing coil 102 that is on the mandrel 106 (described in more detail below) is tightly wrapped on the outer surface of the mandrel 106 and, for some embodiments, is such that the Bragg gratings 110 and 112 are located in predetermined and protected positions. Acoustic energy and the compliance of the mandrel 106 cause the length of the mandrel 106 to change, which induces changes in the outer diameter of the mandrel 106. This causes a change in length ΔL of the length L and a corresponding change in the round trip path of pulses reflected from the second Bragg grating 112, which causes the phase relationship between the light pulses detected at the detector 116 to vary. The analyzer 118 senses the phase variance and provides an electrical output that corresponds to the acoustic energy. The compliance of the mandrel 106 provides the restoring force.

Figure 2:
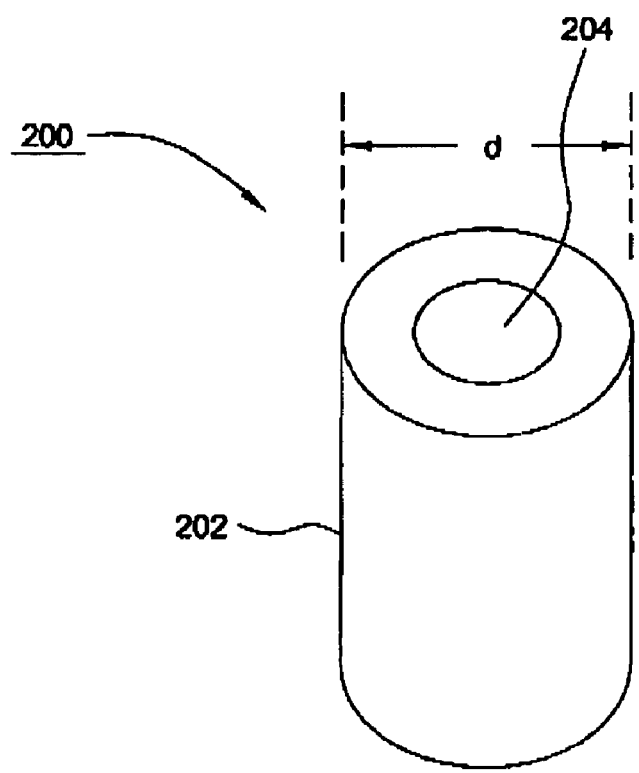
FIG. 2 illustrates a prior art mandrel.

FIG. 2 illustrates a prior art mandrel 200. As shown, that mandrel has a cylindrical shape and an outer surface 202 formed at a diameter d. The mandrel 200 further includes a bore 204 for passing an optical waveguide back through the mandrel 200 after the winding is complete. As noted, positioning the Bragg gratings 112 in the bore 204 is beneficial as that enables sealing the bore 204 to protect the Bragg gratings 112 from physical damage and from external factors such as pressure. A significant problem with the mandrel 200 is wrapping an optical waveguide such that the Bragg gratings were both located within the bore 204. As noted in the "Background" section, mandrels turned on a CNC machine have diameters that can vary by about +/−0.001 inch and Bragg grating positions can vary by as much as 0.14 inch. Thus, it is very difficult to locate both Bragg gratings within the bore 204. Furthermore, the end of the optical waveguide that is brought back through the bore 204 after wrapping can be bent at an excessive angle. This can cause excessive optical losses.

Figure 3:
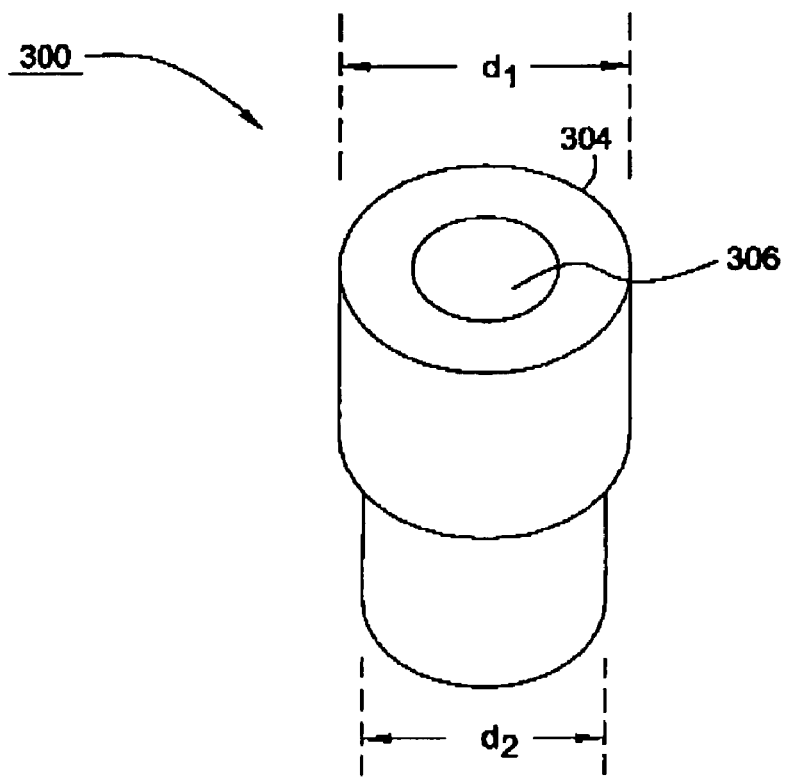
FIG. 3 is an isometric view of a mandrel that is in accord with the principles of the present invention.

The mandrel 106 of FIG. 1 generically represents a class of mandrels that can be configured in various ways. For example, FIG. 3 illustrates a mandrel 300 that is in accord with the principles of the present invention. As shown, the mandrel 300 includes a generally cylindrical body 304 having at least two diameters, d1 and d2. FIG. 3 shows diameters d1 and d2 as being very different. However, in practice, diameters d1 and d2 need vary only slightly. The first diameter d1 is selected to give the best acoustic response without excessive optical power loss produced by bending the optical waveguide 104. The second diameter d2 is selected to provide for accurate placement of the Bragg gratings 112. By varying the number of turns on the surfaces of each diameter, the Bragg gratings on both ends of the optical waveguide 104 can be precisely placed in a bore 306.

Thus, the different diameters permit small designed features that will protect and stabilize the optical characteristics of the Bragg gratings, and at the same time keeping the optical waveguide tightly wound on the sensing surface of the mandrel to give a better signal to noise ratio. The length L of the optical waveguide 104 for the mandrel 300 is determined by the following formula:

$$L \approx N1 \cdot \pi \cdot d1 + N2 \cdot \pi \cdot d2$$

Where N1 is the number of turns wrapped around diameter d1, and N2 is the number of turns wrapped around diameter d2. By providing a relatively small difference between d1 and d2, L2 can be accurately controlled by varying N1 and N2 to accommodate variations due to manufacturing tolerances. For example, if the circumference of the section having diameter d1 is 0.010 inch smaller than the circumference of the section having diameter d2, by winding (N1−1) turns on the first section and (N2+1) turns on the second section, the total length is increased by 0.010 inch (e.g., L'=L+0.01 inch), while the total number of turns is maintained (N1+N2). Thus it can be seen how the number of wraps around each diameter (N1 and N2) may be varied to precisely control the wrapped length, which may also facilitate locating the Bragg gratings 110 and 112 in bore 306

Depending on the application the mandrel 300 can be comprised of a variety of materials, including Nylon, Teflon, or Peek. A good material for most applications will have a low coefficient of thermal expansion and will operate at high temperature.

While the mandrel 300 is beneficial, it may not be optimal in all applications. One drawback of the mandrel 300 is that one or more relatively sharp bends in the optical waveguide 104 is required to bring both Bragg gratings 112 into the bore 306. Sharp bends tend to attenuate optical power in the optical waveguide 104. FIG. 4 illustrates another mandrel 400 that is in accord with the principles of the present invention. As shown, the mandrel 400 includes a generally cylindrical body 404 having at least two diameters, d1 and d2. The first diameter d1 is selected to give the best acoustic response without excessive optical power loss created by bending of the optical waveguide 104, while the second diameter d2 is selected to provide for accurate placement of the Bragg gratings 112. The mandrel 400 includes two bores 408 and 410. The mandrel 400 further includes a guide slot 412 in the mandrel 400 at the second diameter d2, a transition slot 413 that spans across d1 and d2, a guide slot 414 in the mandrel 400 at the first diameter d1, and end slots 416 (one end slot on each end).

To wrap the mandrel 400, the optical waveguide 104 is inserted into the bore 408 such that an optical lead extends from end 428 and such that a Bragg grating 112 is located within the bore 408. The optical waveguide 104 is then placed in the slot 416 at end 430 and brought back through the bore 410. The optical waveguide 104 is then located in the end slot 416 and wrapped so that it enters and follows the guide slot 414. After the guide slot 414 terminates the optical waveguide 104 is tightly wrapped around the portion of the mandrel 400 having the diameter d1. Then, to assist properly locating the other Bragg grating 112 the optical waveguide 104 is placed in the transition slot 413. As the optical waveguide 104 is wrapped further it exits the transition slot 413 and is tightly wrapped on the mandrel 400 at the portion having the diameter d2. Slightly before wrapping the second Bragg grating 112, the optical waveguide 104 is inserted into guide slot 412. Further wrapping causes the optical waveguide 104 to follow the guide slot 412 into the end slot 416 on the end 430. That end slot 416 then guides the optical waveguide 104 into either bore 408 or 410 (depending on how the end slot 416 terminates). The optical waveguide 104 is then passed through that bore such that the Bragg grating 112 is located within the bore. The bores are then sealed to protect the Bragg grating.

The end result is illustrated in FIG. 5. By varying the number of turns on the surfaces having diameters d1 and d2, the Bragg grating 112 can both be precisely located within the mandrel 400. The diameter d2 permits small changes in the wrapping length of the optical waveguide 104 so as to accurately control the length between and precisely locate the Bragg gratings, while at the same time permitting tight winding of the optical waveguide on the surfaces of the mandrel, thus improving signal to noise ratios.

Figure 6:
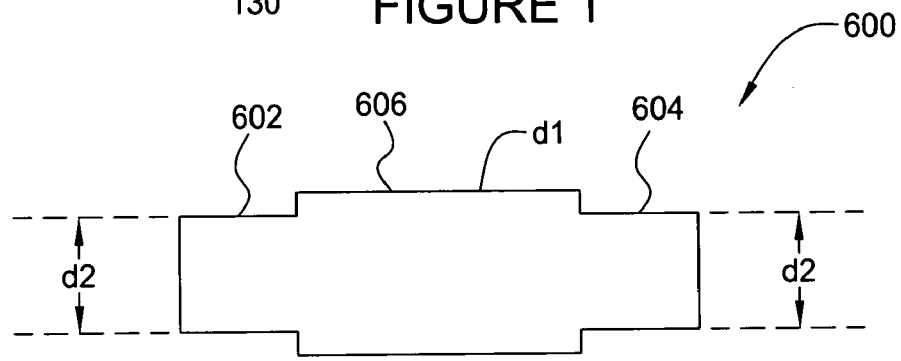
FIG. 6 illustrates a mandrel having three portions and that is in accord with the principles of the present invention.
Figure 7:
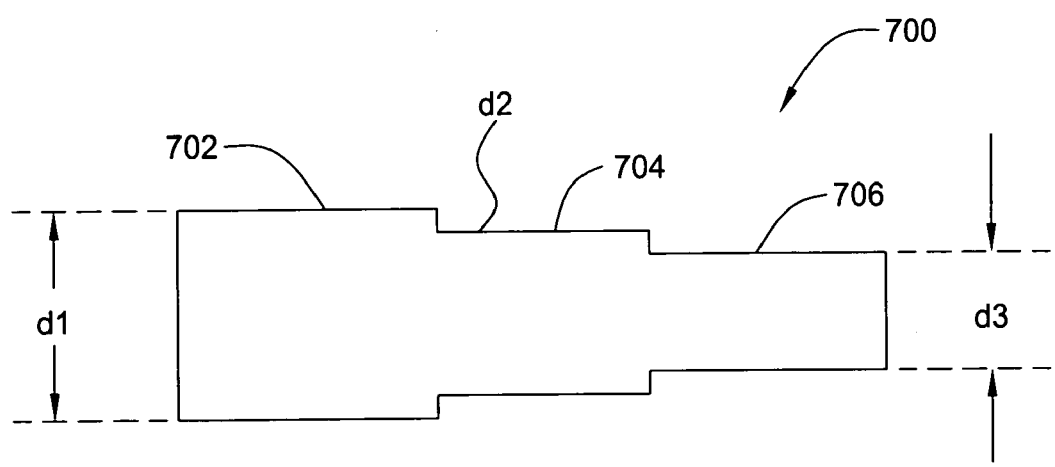
FIG. 7 illustrates a mandrel having three diameters and that is in accord with the principles of the present invention.

While the foregoing has described inventive mandrels having two sections with different diameters, it should be understood that more than two sections are contemplated. For example, FIG. 6 illustrates a mandrel 600 having initial and end mandrel portions 602 and 604, respectively that have diameters d2, and a central portion 606 having diameter d1. Another contemplated embodiment is the mandrel 700 that is illustrated in FIG. 7. That mandrel has a first portion 702 having a diameter d1, a second portion 704 having a diameter d2, and a third portion 706 having a diameter d3. It should also be understood that some applications will use mandrels with bores, while others will not.

While the foregoing is directed to embodiments of the present invention, other and further embodiments of the invention exist or may be devised without departing from the basic scope thereof, and the scope thereof is determined by the claims that follow.

The invention claimed is:

1. An interferometric sensor comprising:
   a mandrel having a first portion with a first diameter and a second portion with a second diameter;
   two Bragg gratings formed in an optical waveguide; and
   a section of optical waveguide between said Bragg gratings with the section defining an interferometric path length to enable sensing acoustic pressures impingent on the mandrel, wherein said section of optical waveguide is wound on said mandrel such that a length of the optical waveguide section is determined by a number of turns wrapped around each of the first and second portions.

2. The interferometric sensor of claim 1, wherein said first portion and said second portion are connected by a slot to guide a portion of the optical waveguide section.

3. The interferometric sensor of claim 1, wherein said mandrel comprises a material selected from a group consisting of Nylon, Teflon, and Peek.

4. The Interferometric sensor of claim 1, wherein said mandrel includes a center bore.

5. The interferometric sensor of claim 4, wherein at least one Bragg grating is located in said center bore.

6. The interferometric sensor of claim 1, wherein said mandrel includes at least two bores.

7. The interferometric sensor of claim 6, wherein at least one Bragg grating is located in a bore.

8. The interferometric sensor of claim 1, wherein said mandrel includes a third portion having said second diameter.

9. The interferometric sensor of claim 8, wherein said first portion is between said second and third portions.

10. The interferometric sensor of claim 7, wherein said mandrel includes a third portion having a third diameter.

11. The interferometric sensor of claim 1, wherein the Bragg gratings are disposed within the mandrel to protect them from strain.

12. An acoustic sensing system comprising:
    a source for generating light pulses;
    an acoustic sensor having two Bragg gratings separated by an optical waveguide section wrapped around a mandrel with a first portion with a first diameter and a second portion with a second diameter, wherein a length of the optical waveguide section is determined by a number of turns wrapped around each of the first and second portions; and signal processing equipment for detecting variations in phase between light pulses reflected from the two Bragg gratings caused by changes in length of the optical waveguide section due to acoustic energy impinging on the mandrel.

13. The acoustic sensing system of claim 12, wherein said first portion and said second portion are connected by a slot to guide the optical waveguide section from the first portion to the second portion.

14. The acoustic sensing system of claim 12, wherein at least one Bragg grating is positioned within a center bore of the mandrel.

15. The acoustic sensing system of claim 12, wherein:
the mandrel includes at least two bores; and
each of the Bragg gratings is positioned within one of the at least two bores.

16. The acoustic sensing system of claim 12, wherein said mandrel includes a third portion having said second diameter.

17. The acoustic sensing system of claim 16, wherein said first portion is between said second and third portions.

18. The acoustic sensing system of claim 12, wherein said mandrel includes a third portion having a third diameter.

19. The acoustic sensing system of claim 12, wherein the Bragg gratings are disposed within the mandrel to protect them from strain.

20. The acoustic sensing system of claim 12, wherein a distance of optical waveguide between the Bragg gratings defines an interferometric path length.

21. A method of controlling a length of an optical waveguide section during manufacture of an interferometric sensor, comprising:

providing a mandrel having at least a first section with a first outer diameter and a second section with a second outer diameter;

wrapping the optical waveguide section a first number of times around the first section and a second number of times around the second section; and controlling the wrapped length of the optical waveguide section by varying the first number and the second number.

22. The method of claim 21, further comprising forming two Bragg gratings that bound the optical waveguide section so as to define an interferometer path length.

23. The method of claim 21, further including the step of placing the Bragg gratings within the mandrel to protect them from strain.

* * * * *